United States Patent
Beard et al.

(10) Patent No.: US 10,946,878 B1
(45) Date of Patent: Mar. 16, 2021

(54) WIRELESS SLIDE FENCE SYSTEM AND METHOD

(71) Applicant: BNSF Railway Company, Fort Worth, TX (US)

(72) Inventors: Mitchell Beard, Shawnee, KS (US); Paul Chiyang Shih, Spokane Valley, WA (US); Paul Aaron Weidle, Flagstaff, AZ (US); Jerry Wade Specht, Overland Park, KS (US); Kent Robert Shue, Bonner Springs, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 16/928,433

(22) Filed: Jul. 14, 2020

(51) Int. Cl.
| | |
|---|---|
| *B61L 23/04* | (2006.01) |
| *B61L 15/00* | (2006.01) |
| *B61L 27/00* | (2006.01) |
| *G01S 15/04* | (2006.01) |
| *G01S 17/04* | (2020.01) |
| *B61L 29/30* | (2006.01) |

(52) U.S. Cl.
CPC ......... *B61L 23/041* (2013.01); *B61L 15/0018* (2013.01); *B61L 27/0005* (2013.01); *B61L 27/0088* (2013.01); *B61L 29/30* (2013.01); *B61L 2205/00* (2013.01); *G01S 15/04* (2013.01); *G01S 17/04* (2020.01)

(58) Field of Classification Search
CPC ...... B61L 23/04; B61L 23/041; B61L 23/042; B61L 27/0088; B61L 29/30
See application file for complete search history.

(56) References Cited

U.S. PATENT DOCUMENTS

| | | |
|---|---|---|
| 5,787,369 A | 7/1998 | Knaak |
| 9,067,609 B2 | 6/2015 | Baldwin et al. |
| 9,533,698 B2 | 1/2017 | Warta et al. |
| 9,610,894 B2 * | 4/2017 | Engel ..................... B60Q 9/008 |

(Continued)

FOREIGN PATENT DOCUMENTS

| | | |
|---|---|---|
| AU | 2019100119 A4 | 3/2019 |
| EP | 1600351 B1 | 1/2007 |

OTHER PUBLICATIONS

Paul Darlington; "New Main-Line Interlocking Enters Service"; Article; Magazine; Rail Engineer; Issue 176; Jul. 2019; pp. 64-68 www.railengineer.co.uk.

*Primary Examiner* — Zachary L Kuhfuss
(74) *Attorney, Agent, or Firm* — Whitaker Chalk Swindle & Schwartz, PLLC; Enrique Sanchez, Jr.

(57) ABSTRACT

A Wireless Slide Fence utilizing signal reflection technology to detect rockslides and can determine the size and location of fallen rocks/objects impeding travel along a train track is presented. The present disclosure solves the technological problem of determining rock size and location to validate rockslide/fall alarms to reduce false alarms, while minimizing repairs required by conventional systems through the use of obstacle detection units and vital logic controllers. The present disclosure improves the performance of the system by, generating validated alarms when fallen rocks/objects satisfy the size criteria and are located in an area hazardous to train operations. In one exemplary embodiment, a loitering time can be implemented to validate object detections to reduce false positives due to transient objects such as migrating animals.

19 Claims, 4 Drawing Sheets

(56) References Cited

U.S. PATENT DOCUMENTS

| | | | |
|---|---|---|---|
| 10,202,135 B2 | 2/2019 | Mian et al. | |
| 10,338,220 B1 | 7/2019 | Raring et al. | |
| 10,518,700 B1 * | 12/2019 | Engel | B61L 27/0088 |
| 10,611,388 B2 * | 4/2020 | Chung | B61L 25/021 |
| 2004/0056182 A1 | 3/2004 | Jamieson et al. | |
| 2008/0073466 A1 * | 3/2008 | Mardirossian | B61L 29/30 |
| | | | 246/125 |
| 2008/0136632 A1 * | 6/2008 | Pieralli | B61L 29/30 |
| | | | 340/552 |
| 2014/0334677 A1 * | 11/2014 | Kuo | G06T 7/70 |
| | | | 382/103 |
| 2015/0285927 A1 * | 10/2015 | Nedilko | B61L 23/041 |
| | | | 702/2 |
| 2016/0039339 A1 * | 2/2016 | Engel | B60Q 9/008 |
| | | | 340/435 |
| 2017/0072972 A1 * | 3/2017 | Shubs | B61L 3/127 |
| 2019/0054937 A1 | 2/2019 | Graetz et al. | |
| 2019/0054942 A1 | 2/2019 | Carlson | |
| 2019/0248392 A1 * | 8/2019 | Bar-Tal | B61L 25/025 |
| 2020/0174110 A1 * | 6/2020 | Carlson | G01S 7/411 |

* cited by examiner

WIRELESS SLIDE FENCE SYSTEM AND METHOD

TECHNICAL FIELD

The present disclosure generally relates to object detection systems and more particularly to wireless slide detection systems.

BACKGROUND

It is common for debris and other objects to fall in railroad tracks. Such objects are obstructions that can affect the safe movement of trains, resulting in train derailment or damage to locomotives. The size of the object can greatly affect the magnitude of the disruption to a locomotive.

Traditional slide fences are installed at rockfall hazard locations to detect rockslides/falls that may impede travel along the track and cause damage to locomotives and/or injury to railroad employees. Several slide fence types and configurations can be deployed for detecting such potential hazards, but each suffers from certain pitfalls. For example, open-line wire slide fences are comprised of line wire strung end-to-end the length of the hazard area. A power source is connected to a pair of line wires and a series electrical circuit is created through each sequential line wire pair to energize a relay (closed loop principle). Falling rocks or objects break the line wire, opening the series circuit, de-energizing the relay, and indicates a hazard is detected.

Such conventional slide fences are electrically circuited based on the fail-safe (closed-loop) principle. However, slide fence hazard detection systems are prone to missed events. Sliding and falling rocks having the potential for hazardous train operations can pass between the line wires or fall pass slide fences and canopies/umbrellas undetected. For detected rockslides and falls, the conventional slide fence technology is unable to determine fallen rock size or location. Fallen rocks small in size or not impeding travel along the track that break a slide fence wire are determined as valid alarms, although they pose no danger to train operations. Additionally, the inability to determine if a detected rockslide or fall poses a valid hazard to train operation can result in false alarms causing needless train delay and reduced network velocity. False alarms not only cause needless train delay, but over time in active rock fall areas, can result in train crew complacency and can condition railway personnel to doubt the validity of slide fence alarms, thereby adding unnecessary risk to train operations.

Since some level of slide fence damage results in detecting fallen rocks, maintenance personnel must be dispatched to repair the slide fence, regardless of whether the fallen rocks are a hazard to train operations. This places maintenance personnel at increased risk while facilitating slide fence repairs during active rock-slide conditions and track traffic. Additionally, train delay is incurred pending slide fence repairs. In some cases, the rockslide can be significant enough to destroy several sections of slide fence. In these situations, it can take considerable time and manpower to rebuild a slide fence after the rocks and debris are removed.

SUMMARY

The present disclosure achieves technical advantages as a Wireless Slide Fence utilizing signal reflection technology to detect rockslides and can determine the size and location of fallen rocks/objects impeding travel along the track (e.g., within 4 feet of the outside edge of a rail). The present disclosure solves the technological problem of determining rock size and location to validate rockslide/fall alarms to reduce false alarms. This Wireless Slide Fence can accommodate any volume of train density, gross tonnage, passenger train movement density, hazardous materials, railroad operating rules, and operating speeds. The Wireless Slide Fence can also be retrofitted to existing slide fence systems as a replacement at current slide fence locations or as a new installation at new slide fence locations.

The present disclosure improves the performance of the system itself by, generating validated alarms when fallen rocks/objects satisfy the size criteria and are located in an area hazardous to train operations. In one exemplary embodiment, a loitering time can be implemented to validate object detections to reduce false positives due to transient objects such as migrating animals. In another exemplary embodiment, video camera can be utilized to further validate an activation notification. In another exemplary embodiment, when a validated alarm is generated, the Wireless Slide Fence can provide an output to a train control system or a signal system to indicate a hazard is detected and transmit a slide fence activation notification to the train dispatcher. The Wireless Slide Fence notification can be removed when the object is removed from the tracks. Thus, risk to maintenance personnel is reduced as rockfall detection does not require destruction of equipment that is characteristic of the wired slide fence. Risk to personnel is mitigated during repair of any portions of the Wireless Slide Fence damaged by rockfall as repair activities are limited to replacing the affected Wireless Slide Fence Obstacle Detection (OD) unit and uploading the pertinent configuration onto the sensor.

It is an object of the disclosure to provide a wireless slide fence system configured to detect an object capable of obstructing train passage along a track. It is a further object of the disclosure to provide a wireless slide fence system configured to generate an indication of an obstacle when an object capable of obstructing train passage is identified. It is a further object of the disclosure to provide a computer-implemented method for generating an indication of an obstacle when an object capable of obstructing train passage is identified. These and other objects are provided by the following embodiments.

In one exemplary embodiment, a wireless slide fence system configured to detect an object capable of obstructing train passage along a track, includes: a plurality of obstacle detection units configured to transmit a signal proximate a railroad track and receive a reflection of the signal from an object proximate the railroad track, wherein one or more obstacle detection units detect an object in a detection zone and generate a detection alert, when the reflected signal is received; and a vital logic controller operably coupled to the obstacle detection units and configured to control the obstacle detection units, receive the alert, and transmit an indication of an obstacle to a signal system or train control system to reduce its speed or stop. The signal transmitted by the plurality of obstacle detection units can be a LiDAR signal (e.g., laser beam). The signal transmitted by the plurality of obstacle detection units can be an acoustic signal, an optical signal, a RADAR signal, or any other suitable signal. Each of the plurality of obstacle detection units can have a field of view different from the other obstacle detection units. Adjacent fields of view can at least partially overlap. Obstacle detection units can generate a detection alert when the object has a width greater than a predetermined width. Obstacle detection units can generate the detection alert only if the object is still detected after a predetermined loitering time. The object can be continuously detected during the predetermined loitering time to be determined a valid alert. The obstacle detection units can include shutters configured to open and close to protect the obstacle detection unit from damage. The vital logic controller can open and close the shutters.

In another exemplary embodiment, a wireless slide fence system can be configured to generate an indication of an obstacle when an object capable of obstructing train passage is identified, including: a vital logic controller including computer-executable instructions that when executed cause the controller to: receive an obstacle detection alert from an obstacle detection unit for an object in a detection zone proximate a railroad track; determine whether the object is in the detection zone after a predetermined loitering time; transmit an indication of an obstacle to a signal system or train control system via an encrypted network if the object is in the detection zone after the predetermined loitering time; close shutters disposed on the obstacle detection unit to protect a transceiver for a predetermined period; open the shutters for a predetermined rescan period to rescan the detection zone for the object; determine whether the object is in the detection zone after a predetermined re-scan period; clear the alarm state and the indication of the obstacle to the train. The railroad signaling system can be programmed to flash red to indicate to a train that it must proceed at restricted speed and stop short of any obstruction. The vital logic controller can transmit the indication directly to the train's onboard positive train control (PTC) system or a signal system. All object detection units can continuously report a clear state over a clear time period during the re-scan period. The clear time period can be at least a portion of the re-scan period.

In another exemplary embodiment, a computer-implemented method for generating an indication of an obstacle when an object capable of obstructing train passage is identified, the computer-implemented method comprising: receiving an obstacle detection alert from an obstacle detection unit for an object in a detection zone proximate a railroad track; determining whether the object is in the detection zone after a predetermined loitering time; transmitting an indication of an obstacle to a train control system or a signaling system via an encrypted network if the object is in the detection zone after the predetermined loitering time; closing shutters disposed on the obstacle detection unit to protect a transceiver for a predetermined period; opening the shutters for a predetermined rescan period to rescan the detection zone for an object; determining whether the object is in the detection zone after a predetermined re-scan period; clearing the alarm state and the indication of the obstacle to the train control system via an encrypted network. The train signaling system can be programmed to flash red to indicate to a train that it must proceed at restricted speed and stop short of any obstruction. The vital logic controller can transmit the indication directly to the train's onboard positive train control (PTC) system or the signaling system. All object detection units can continuously report a clear state over a clear time period during the re-scan period. The clear time period can be at least a portion of the re-scan period.

DETAILED DESCRIPTION OF THE INVENTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims. Although the slide fence system may be described in terms of specific wireless technologies, any suitable signal transmission and reflection reception technology may be utilized. As such, the disclosure herein is not intended to be limited to a specific wireless technology.

Figure 1:
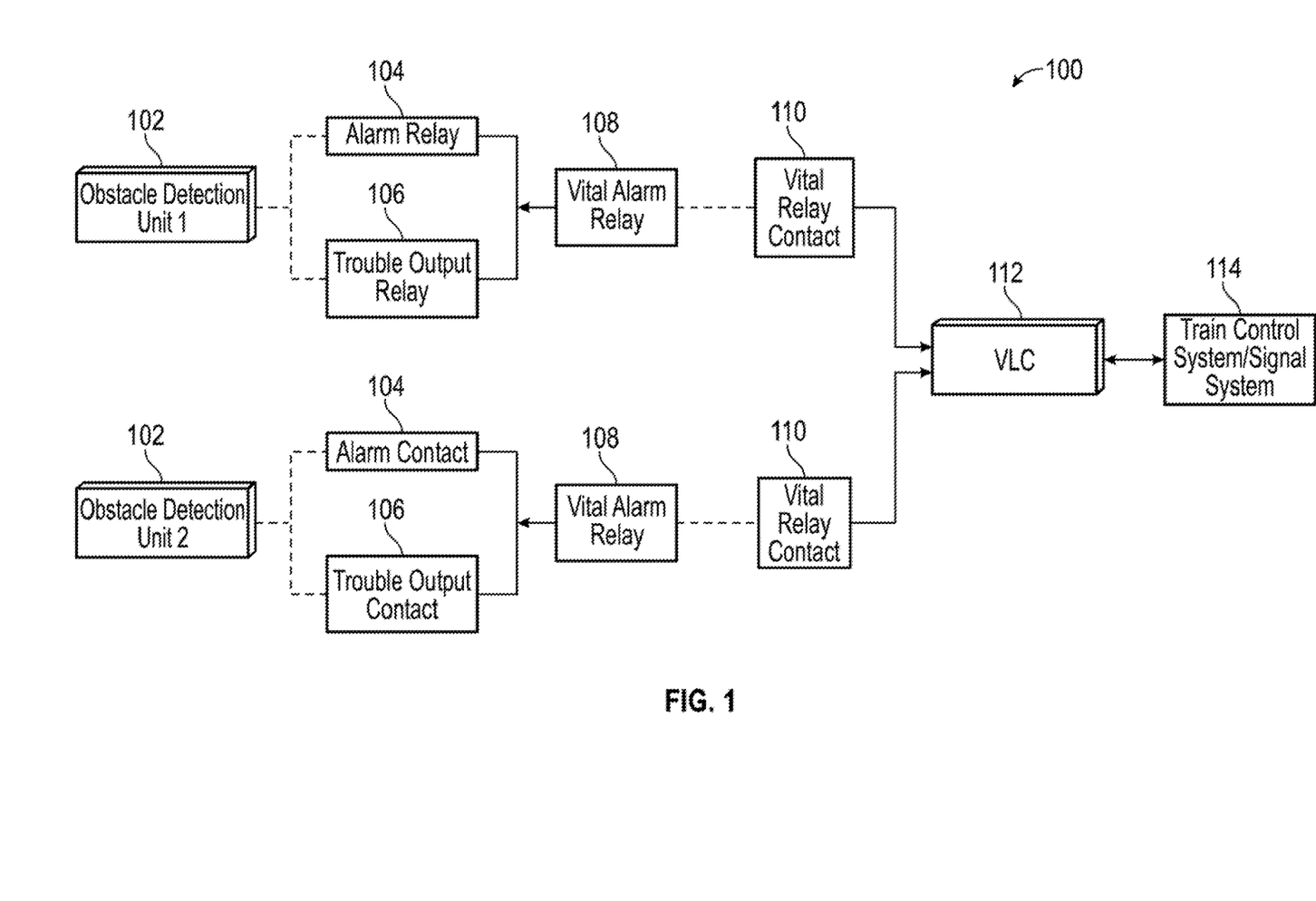
FIG. 1 shows a schematic view of a Wireless Slide Fence system, in accordance with one or more exemplary embodiment of the present disclosure.

FIG. 1 shows a schematic view of a Wireless Slide Fence system 100, in accordance with one exemplary embodiment of the present disclosure. The Wireless Slide Fence 100 can include a Obstacle detection (OD) unit 102, an alarm relay 104, a trouble output relay 106, a vital alarm relay 108, a vital relay contact 110, a Vital Logic Controller (VLC) 112, and a signal system and/or train control system 114.

The aforementioned system components 102, 104, 106, 108, 110, 112, and 114 can be communicably coupled to each other via a network, such as the Internet, intranet, system bus, or other suitable network, wired or wireless. The communication can be encrypted, unencrypted, over a VPN tunnel, or transmitted over other suitable communication means. The network can be a WAN, LAN, PAN, or other suitable network. The network communication between the system components 102, 104, 106, 108, 110, 112, and 114, can be encrypted using PGP, Blowfish, AES, 3DES, HTTPS, or other suitable encryption. The network communication can occur via application programming interface (API), ANSI-X12, Ethernet, Wi-Fi, Bluetooth, PCI-Express, USB, or other suitable communication protocol. Additionally, databases having obstacle detection or control data can be operably coupled to the system components VLC 112.

The Obstacle detection unit 102 can be a sensor that can detect fallen rocks or other objects on or near a railway line. The Obstacle detection unit 102 can be an area sensor used to detect objects by emitting laser beams, optical signals, acoustic signals, or other suitable signals, and measure the time required for reflected beams to be received by a receiver. In one exemplary embodiment, the Obstacle detection unit 102 can have a detection area of approximately 100 feet over 190-degree arc. In another exemplary embodiment, the Obstacle detection unit 102 can incorporate IEC 60825-1 defined Class 1 laser beams (IEC), imposing a detection plane covering above the railroad tracks.

In another exemplary embodiment, each Obstacle detection unit 102 can include a transmitter and a receiver, a transceiver, or other suitable communication device. In another exemplary embodiment, the transmitter and receiver can be mounted together in a single sensor housing. In another embodiment, transmitter and receiver can be mounted in separate housings. In another exemplary embodiment, the Obstacle detection unit 102 can include separate acoustic transducers for each transmitter and receiver. In another exemplary embodiment, a single acoustic transducer can be used for both transmitting a signal and receiving its reflection. In another exemplary embodiment, Obstacle detection unit 102 can include a micropower impulse radar (MIR) device. In yet another exemplary embodiment, Obstacle detection unit 102 can include a microwave transceiver device. The Obstacle detection unit 102 can include a small integrated antenna and electronic interface board. In another exemplary embodiment, the Obstacle detection unit 102 can include a heating element to ensure the Obstacle detection unit 102 can function without impairment due to ice or fog.

The Obstacle detection unit 102 can detect an object by emitting signals (e.g. laser beams, acoustic signals, or other suitable signals) via the transmitter/transceiver at an object, and measuring the time required for the emitted signals to be reflected by the object and received by the receiver/transceiver. The Obstacle detection unit 102 can include a processor and/or controller for controlling the various components of the Obstacle detection unit 102. In one exemplary embodiment, the Obstacle detection unit 102 can determine an object detection via the processor and transmit the detection to the VLC 114. In another exemplary embodiment, the Obstacle detection unit 102 can transmit the received data to the VLC 114 and the VLC 114 can determine whether an object was detected by the Obstacle detection unit 102.

Each Obstacle detection unit 102 housing can include a motorized shutter that can be activated under specific conditions to protect the Obstacle detection unit 102 from contamination or damage. In one exemplary embodiment, the VLC 112 is "vital" because it has a probability of failing in an unsafe state of $10^{-9}$ (one failure in one billion events). Alternatively, the VLC 112 can have any reliability/failure probability rating required for a particular application. For example, VLC 112 can transmit a signal to each Obstacle detection unit 102 to close the shutter when a train is within a particular area or detection zone. In one exemplary embodiment, an Obstacle detection unit 102 can detect the train and transmit a detection signal to VLC 112, which in turn generates a shutter close signal to each Obstacle detection unit 102. Each Obstacle detection unit 102 can be mounted on posts proximate the railroad tracks with sufficient distance to transmit a signal and receive its reflection with sufficient signal fidelity to detect the size and location of an object on or near the railroad tracks. The Obstacle detection unit 102 can have external elements to adjust the horizontal and vertical alignment of the Obstacle detection unit 102. In one exemplary embodiment, the output of the Obstacle detection unit 102 transmitter can be reduced, and the sensitivity of the Obstacle detection unit 102 receiver can be increased by VLC 112. In another exemplary embodiment, the VLC 112 can include additional control logic or an interface to external control logic. The normal state of the motorized shutter is in the open position to allow for active scanning of the detection area. The movement of the motorized shutter can be controlled by a linear actuator that can receive control signals from the Obstacle detection unit 102 processor or the VLC 112 to open or close the shutter.

One or more Obstacle detection units 102 can be operably coupled with the VLC 112 to form a slide fence network to detect hazards. The VLC 112 can provide an interface between the Obstacle detection units 102 and the Signal System/Train Control System 114. Additionally, the VLC 112 can detect train movements, perform diagnostic checks, and determine when to generate an alarm. In one exemplary embodiment, with no alarm indications from all Obstacle detection units 102, the VLC 112 can allow trains to proceed at a maximum authorized speed. When a train is present in the detection zone, the VLC 112 can drive actuators to close shutters and protect the sensors from contamination Every time the shutters are driven closed, the VLC 112 can perform a safety check to ensure the Obstacle detection units 102 are operational. If any safety checks fail, the VLC 112 can put the signal system in safe state.

In one exemplary embodiment, two or more Obstacle detection units 102 can continuously monitor any predetermined area of the railroad track, the monitored area of the railroad track can be designated a detection zone. In another exemplary embodiment, the Obstacle detection units 102 can be coupled in parallel so that detection by one Obstacle detection unit 102 is sufficient to generate an object detection indication. In another exemplary embodiment a camera can be disposed in the Obstacle detection unit 102 to provide visual confirmation of an object on or around the train tracks. Alternatively, the camera can be disposed proximate the Obstacle detection unit 102, yet operably coupled to the VLC 112. The use of a video camera to corroborate the indication of a detection of an object on or near the train tracks is optional.

In one exemplary embodiment, each Obstacle detection unit 102 can convey the presence of an object by activating an alarm relay 104 that can be tied externally to the coils of a vital alarm relay 108. The contacts of a trouble output relay 106 can be wired in series with the alarm relay 104 and the vital alarm relay 108. In one exemplary embodiment, the vital alarm relay 108 can be the second relay of the same hardware as the alarm relay 104. The trouble output relay 106 can de-energize when the Obstacle detection unit 102 determines that its scanning surface has been completely obfuscated (e.g. from a closed shutter or soiled scanning window) by identifying a high proportion of reflected signals (e.g., optical beams, acoustic signals, etc.) at its receiver. The vital relay contact 110 can control an input into the VLC 112. In another exemplary embodiment, once the VLC 112 ceases to receive the input from the vital relay contact 110, the detection information can be conveyed to the signal system/train control system 114.

Figure 2:
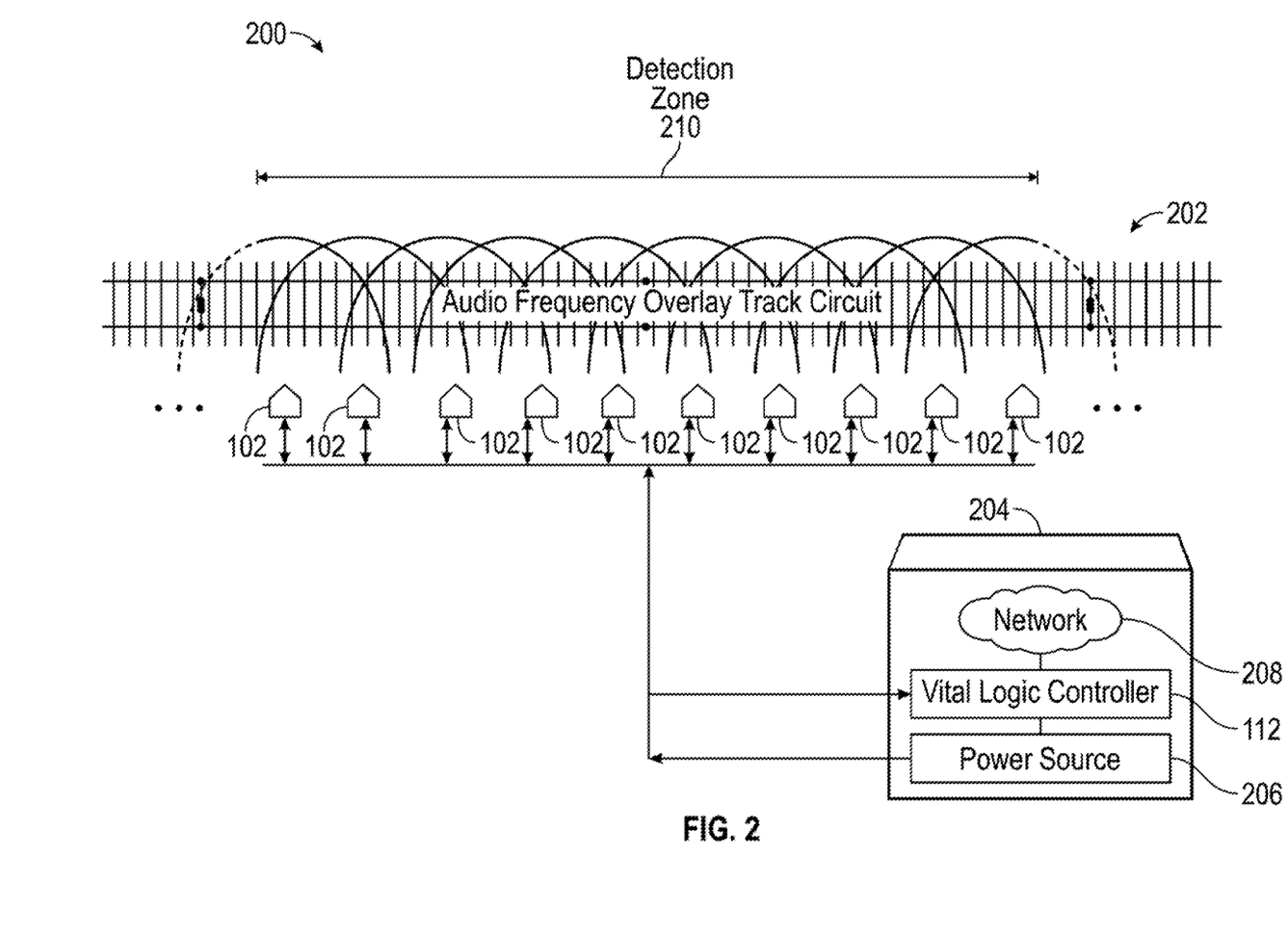
FIG. 2 shows a schematic view of a Wireless Slide Fence system installation, in accordance with one or more exemplary embodiments of the present disclosure.

FIG. 2 shows a schematic view of a Wireless Slide Fence system installation 200, in accordance with one exemplary embodiment of the present disclosure. Wireless Slide Fence system installation 200 can include train tracks 202, Obstacle detection unit 102, a detection zone 210, an equipment shelter 204, having a Vital Logic Controller (VLC) 112 and power source 206, with access to a network 208.

Obstacle detection units 102 can be mounted onto poles/posts disposed proximate to the tracks 202. In one exemplary embodiment, the Obstacle detection unit 102 are disposed on the poles at a height allowing for a 27-inch diameter object to be reliably detected. In another exemplary embodiment, a plurality of Obstacle detection units 102 can be spaced at a maximum of 100 feet from each other. Each Obstacle detection unit 102 can have a unique identifier to identify each Obstacle detection unit 102. The location of each Obstacle detection unit 102 can be stored in the VLC 112 or other suitable device to assist in object location. In another exemplary embodiment, each Obstacle detection unit 102 can emit a laser beam, acoustic signal, optical signal, or other suitable signal to detect objects within a 100-foot radius from the center of the mounting post.

The Obstacle detection unit 102 or the VLC 112 can detect the presence of an object on or near the tracks 202. In one exemplary embodiment, the detection is based upon the size of the object. In another exemplary embodiment, the detection is based upon the location of the object. In yet another exemplary embodiment, the detection is based upon the size and location of the object. The size of an object on or near the tracks can trigger a detection. For example, considering a typical (132-136 pound) rail height of slightly over 7 inches, the maximum allowed locomotive snow plow/pilot clearance of 6 inches above top of rail and typical locomotive under-body clearance of approximately 8 inches above top of rail, a boulder with a height of approximately 15 inches or less would likely pass under the train without resulting in a derailment. In one exemplary embodiment, the Obstacle detection unit 102 or the VLC 112 can calculate the height and width of an object on or near the tracks 202, given the data received by the Obstacle detection unit 102. In another exemplary embodiment, the volume of the object can be determined using the reflection of the received signals. In another exemplary embodiment, the volume of the object can be determined by mathematically approximating the object as an ellipsoid, using the height (major axis) and width (minor axis) of the object as received by the Obstacle detection unit 102. The location of the object can be determined by the Obstacle detection units 102 that detect an object, using the predetermined location of each Obstacle detection unit 102.

The spacing along the length of track through the detection zone 210 ensures the zone 210 can be monitored by a minimum of two LIDAR OD units or redundancy. In one exemplary embodiment, during installation, each LIDAR OD Unit 112 can be used to delineate the detection zone 210 prescribed by the tracks 202. In one exemplary embodiment, each LIDAR OD Unit 112 can have its own field of view. The LIDAR OD Unit 112 can be placed such that a first LIDAR OD Unit 112 can overlap a second LIDAR OD Unit 112 field of view, such that at least two LIDAR OD Units 112 are capable of detecting an object in the detection zone 210, save the two LIDAR OD Units 112 on each end of the detection zone 210. the two LIDAR OD Units 112 on each end of the detection zone 210 only have overlap for half of their fields of view. To preserve redundancy across the entire slide fence, the LIDAR OD units at either edge of the slide fence detection zone can only monitor the area overlapped with its adjacent sensor. Alternatively, no field of view overlap (redundancy) can be implemented with a cost of increased risk to operations and personnel. An audio frequency overlay (AFO) track circuit can be installed the length of detection zone 210. Shunting the AFO track circuit can prepare the Wireless OD system for train passage.

The Obstacle detection units 102 can be operably coupled to the VLC 112 and the power source 206 disposed in the equipment shelter 204 by infrastructure such as, underground cables, above ground cables, or wireless network, among other suitable communication means. In one exemplary embodiment, the power source 206 can utilize the infrastructure to provide power to the Obstacle detection units 102 and associated equipment, such as shutters, actuators, heaters, transmitters, receivers, controllers, processors, or other suitable devices. In another exemplary embodiment, the VLC 112 can utilize the infrastructure to effect shutter control, transmitter control, receiver control, relay control, and system test control of the Obstacle detection units 102. In another exemplary embodiment, diagnostics can be performed to verify the integrity of the Obstacle detection units 102 every time a train passes through the slide fence detection area. The system 200 can be designed to close the Obstacle detection unit's 102 protective shutters on the approach of a train. When the protective shutters close, the Obstacle detection units 102 can detect the closed shutters and deenergize the vital alarm relays 108. If the redundant Obstacle detection unit 102 pairs de-energize their corresponding vital alarm relays 108 during train passage, the self-test can be considered successful (passed).

In one exemplary embodiment, if during train passage, one of the redundant Obstacle detection unit 102 pairs fails the self-test, a non-critical alert message is generated for maintenance. If the condition causing the non-critical alert message is not repaired within a predetermined period of time (e.g., five hours), the condition becomes an alarm. In another exemplary embodiment, if during train passage, both redundant Obstacle detection unit 102 pairs fail the self-test, an alarm is generated in the same manner as if an object is detected.

Figure 3:
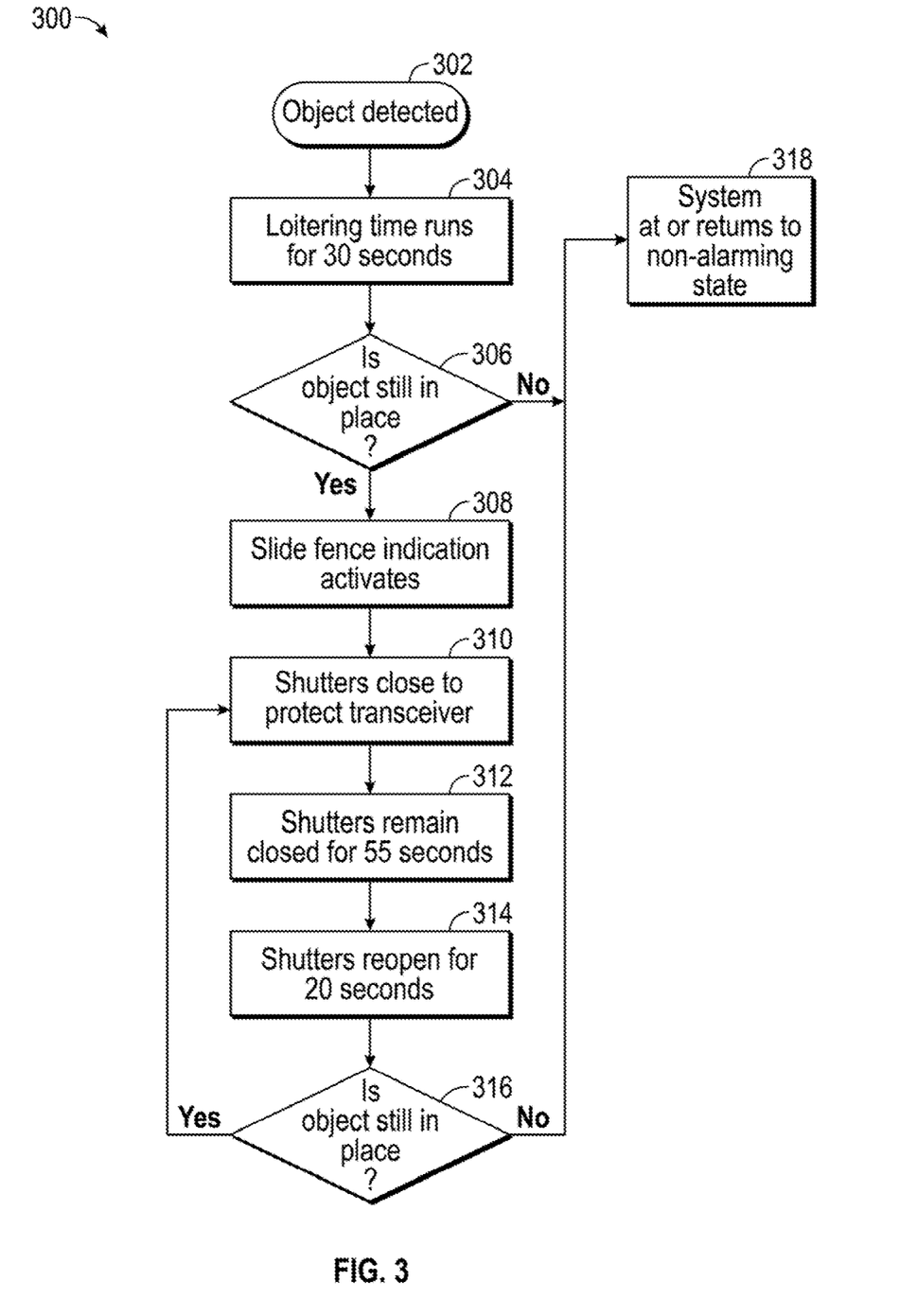
FIG. 3 illustrates a flow chart diagram exemplifying control logic embodying features of a method for slide fence system operation, in accordance with one or more exemplary embodiments of the present disclosure.

FIG. 3 illustrates a flow chart diagram 300 exemplifying control logic embodying features of a method for a slide fence system operation, in accordance with one exemplary embodiment of the present disclosure. The slide fence control logic 300 can be implemented as a VLC 112 appliance, an algorithm on a server, a machine learning module, or other suitable system. The VLC 112 can be a server having machine-readable instructions. The slide fence control logic 300 can be achieved with software, hardware, an application programming interface (API), a network connection, a network transfer protocol, HTML, DHTML, JavaScript, Dojo, Ruby, Rails, other suitable applications, or suitable combinations thereof.

The server can be implemented in hardware, software, or a suitable combination of hardware and software therefor, and may comprise one or more software systems operating on one or more servers, having one or more processors, with access to memory. Server(s) can include electronic storage, one or more processors, and/or other components. Server(s) can include communication lines, or ports to enable the exchange of information with a network and/or other computing platforms. Server(s) can also include a plurality of hardware, software, and/or firmware components operating together to provide the functionality attributed herein to server(s). For example, server(s) can be implemented by a cloud of computing platforms operating together as server(s). Additionally, the server can include memory.

Memory can comprise electronic storage that can include non-transitory storage media that electronically stores information. The electronic storage media of electronic storage may include one or both of system storage that is provided integrally (i.e., substantially non-removable) with server(s) and/or removable storage that is removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store machine-readable instructions, software algorithms, information determined by processor(s), information received from server(s), information received from computing platform(s), and/or other information that enables server(s) to function as described herein. The electronic storage can also be accessible via a network connection.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information, such as FPGAs or ASICs. The processor(s) may be a single entity or include a plurality of processing units. These processing units may be physically located within the same device, or processor(s) may represent processing functionality of a plurality of devices operating in coordination or software functionality.

The processor(s) can be configured to execute machine-readable instruction or learning modules by software, hardware, firmware, some combination of software, hardware, and/or firmware, and/or other mechanisms for configuring processing capabilities on processor(s). As used herein, the term "machine-readable instruction" may refer to any component or set of components that perform the functionality attributed to the machine-readable instruction component. This can include one or more physical processors during execution of processor readable instructions, the processor readable instructions, circuitry, hardware, storage media, or any other components.

The server can be configured with machine-readable instructions having one or more functional modules. The machine-readable instructions can be implemented on one or more servers, having one or more processors, with access to memory. The machine-readable instructions can be executed on a single networked node, or a machine cluster, which can include a distributed architecture of a plurality of networked nodes. The machine-readable instructions can include control logic for implementing various functionality, as described in more detail below. The VLC 212 can include machine-readable instructions implementing the control logic embodying features of a method for slide fence system operation.

The slide fence control logic 300 can leverage the ability of a computer platform to spawn multiple processes and threads by processing data simultaneously. The speed and efficiency of the slide fence control logic 300 can be greatly improved by instantiating more than one process to operate various slide fence system functionality. However, one skilled in the art of programming will appreciate that use of a single processing thread may also be utilized and is within the scope of the present disclosure.

The slide fence control logic 300 process flow of the present embodiment begins at step 302, where the control logic can detect an object. In another exemplary embodiment the object is detected by the Obstacle detection unit 102 and transmits an indication of a detection, a notification of the detection (alert), or other suitable signal related to the object to the VLC 112. One or more detections/indications can be received for the same object from one or more Obstacle detection units 102. In another exemplary embodiment, the control logic 300 can detect the object in the manner disclosed above.

In another exemplary embodiment, a train approaching the detection zone 210 can shunt the audio frequency overlay (AFO) track circuit. In another exemplary embodiment, the de-energized overlay track circuit can activate the Obstacle detection unit 102 shutter control circuit or trigger the control logic 300 to close the protective shutters. The protective shutters can remain closed during train passage to protect the Obstacle detection unit 102. When the train departs the detection zone 210, the AFO track circuit can energize, thus triggering the control logic 300 to deactivate the LIDAR OD shutter control, opening the protector shutters.

When a qualifying object is detected, the sensing LIDAR OD Units' 102 alarm relays 104 can de-energize, indicating an alarm (detection) to the control logic 300. The control logic 300 can, in turn, communicate the alarm to the signal system or train control system 114 via a network 208. In another exemplary embodiment, a slide fence activation indication (alert) can also be transmitted by the control logic 300 to a remote location, such as a dispatcher, via the network 208. In yet another exemplary embodiment, the VLC 1112 can require a steady electrical input from all the Obstacle detection units 102 to keep the system at a non-alarming (permissive) state. In one exemplary embodiment, the control logic 300 can be programmed to interpret one LIDAR OD Unit's 102 de-energized state, regardless of other Obstacle detection unit 102 coverage area overlap, as a positive identification of an obstacle on the tracks.

In another exemplary embodiment, each LIDAR OD Unit 112 can be configured to identify any obstruction having a width greater than 12" in its direct line of sight (0° from datum) to be an obstacle on the tracks. This ensures that a closed shutter will always generate an alarm from the LIDAR OD Unit 112. Objects of proper size identified within the detection zone 210 can cause the Obstacle detection units 102 to alarm the control logic 300. In another exemplary embodiment, dirt or debris that accumulates on the LIDAR OD Unit 112 can generate an alarm if a sufficient quantity aggregates to prevent the LIDAR OD Unit 112 from properly scanning its detection area. The control logic 300 then proceeds to step 304.

At step 304, the slide fence control logic 300 can implement a loitering time. To prevent false alarms, the slide fence control logic 300 can includes a loitering time feature, where an object must be detected continuously for 30 seconds before the object is determined a valid alarm. By implementing a loiter time, the control logic provides a window of time to prevent false hazard detections due to conditions such as an animal walking across the tracks. In one exemplary embodiment, the feature must be validating using video from a video camera. The loiter feature prevents momentary detected obstructions (e.g., birds, animals, wind-blown debris, etc.) from alarming the system. In another exemplary embodiment, a loitering time of 30 seconds or less is assumed to not add additional risk to the safety case. For example, trains can require 30 seconds of preview time to respond and act upon a signal indication. So, there exists a risk, with or without a loitering time, where a rock may fall and impede train traffic leading to a hazardous event. In another exemplary embodiment, in addition to preventing false alarms for operational efficiency, loitering time can be utilized as a mitigation against train crew loss of confidence in the system that can develop if false alarms are repeatedly proliferated by the system. Upon detecting an object of size, the Obstacle detection unit 102 can indicate an alarming condition to the VLC 112 by generating a message, notification or other suitable signal that is sent to VLC 112. Receiving this indication from any single LIDAR OD unit can trigger the VLC 112 to begin a timer countdown (e.g., 30 seconds). Once timer countdown has expired, the VLC can communicate an alarm status to the signal system or train control system and transmit the slide fence indication to the dispatcher via the network 208. The control logic 300 then proceeds to step 306.

At step 306, the slide fence control logic 300 determines whether an object is still in place. In one exemplary embodiment, after reopening, the Obstacle detection units 102 have a predetermined scan period to re-scan the area and determine a clear status. In another exemplary embodiment, for the detection zone 212 to be considered clear, all Obstacle detection units 102 must continuously report a clear state over a clear time period (e.g., at least 10 seconds) during the re-scan period (e.g., 20 seconds). If the object is removed and the re-scan period (e.g., 20 seconds) declares a clear status, the alarms are reset, and the control logic 300 proceeds to step 318. If the object is not removed, the system remains in alarm and the control logic 300 proceeds to step 308.

At step 308 the slide fence control logic 300 can activate a slide fence indication. In one exemplary embodiment, the control logic 300 can communicate the indication of an object to the signal system or train control system 114 via the network 208. In one exemplary embodiment, the train control system can include a train signaling system, such that the train signaling system can be programmed to flash red to indicate to a locomotive that it must proceed at restricted speed and stop short of any obstruction. In another exemplary embodiment, the control logic can transmit the indication directly to the locomotive's onboard positive train control (PTC) system. In another exemplary embodiment, a slide fence activation indication (alert) can also be transmitted by the slide fence control logic 300 to a remote location, such as a dispatcher, via the network 208. The control logic 300 then proceeds to step 310.

At step 310 the slide fence control logic 300 can close to protect the Obstacle detection units 102. The control logic 300 then proceeds to step 312.

At step 312 the slide fence control logic 300 keeps the shutters closed for a protective shutter activation period, such as 55 seconds, or any suitable time period. The control logic 300 then proceeds to step 314.

At step 314 the slide fence control logic 300 can reopen the shutters for a rescan cycle (e.g., 20 seconds). In one exemplary embodiment, after reopening, the Obstacle detection units 102 have a predetermined scan period to re-scan the area and determine a clear state. In another exemplary embodiment, for the detection zone 212 to be considered clear, all Obstacle detection units 102 must report a clear state for a clear time period (e.g., at least 10 seconds) continuously during the re-scan period (e.g., 20 seconds). The control logic 300 then proceeds to step 316.

At step 316, the slide fence control logic 300 determines whether the object is still in place. In one exemplary embodiment, after reopening, the Obstacle detection units 102 have a predetermined scan period to re-scan the area and determine a clear state. In another exemplary embodiment, for the detection zone 212 to be considered clear, all Obstacle detection units 102 must continuously report a clear state over a clear time period (e.g., at least 10 seconds) during the re-scan period (e.g., 20 seconds). If the object is removed and the re-scan period (e.g., 20 seconds) declares a clear state, the control logic 300 can reset the alarms, and the control logic 300 proceeds to step 318. If the object is not removed, the system remains in alarm and the control logic 300 proceeds to step 310.

At step 318, the slide fence control logic 300 can be restored to normal operations and clear the alarm state. The control logic 300 then terminates or awaits a new object detection signal and can repeat the aforementioned steps.

Figure 4A:
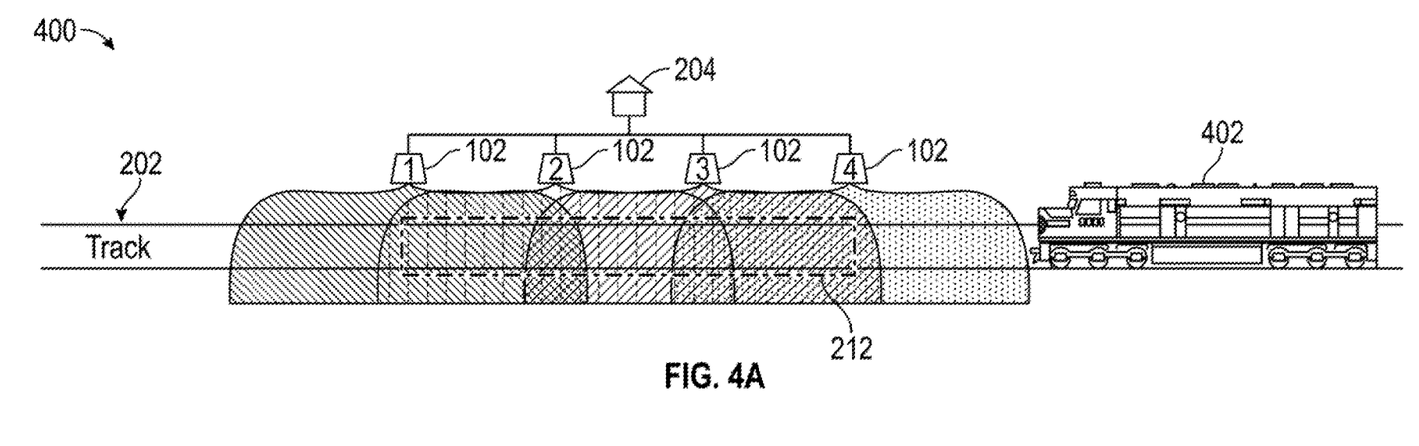
FIGS. 4A and 4B show a perspective view of a Wireless Slide Fence system installation, in accordance with one or more exemplary embodiments of the present disclosure.
Figure 4B:
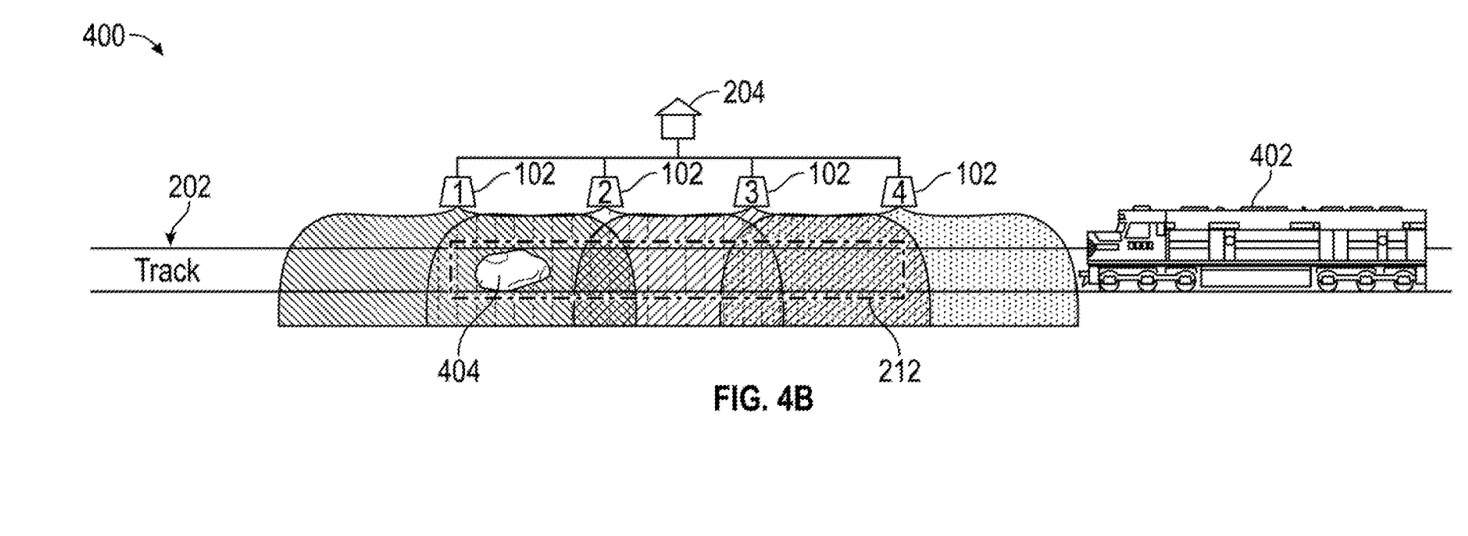

FIGS. 4A and 4B show a perspective view of a Wireless Slide Fence system installation 400, in accordance with one exemplary embodiment of the present disclosure. Wireless Slide Fence system installation 400 can include train tracks 202, a plurality of Obstacle detection units 102, a detection zone 210, an equipment shelter 204, having a logic controller and power source, with access to a network. The Obstacle detection units 102 can be configured to scan individual zones or fields of view 1, 2, 3, 4. These individual fields of view 1, 2, 3, 4 can make up the detection area 212. In one exemplary embodiment, the detection area can be defined by the area at or around the track that can be monitored by at least two overlapping zones. The Obstacle detection units 102 can actively scan perpendicular to the tracks 202 for any objects/hazards. In one exemplary embodiment, the Obstacle detection units 102 can scan the detection zone 212 for any objects between the rails and within 4 feet of either side of the rails, and 27 inches above the track. In another exemplary embodiment, the Obstacle detection units 102 can scan the detection zone 212 for any objects in any area around the train tracks within the operational limits of the Obstacle detection units 102. In another exemplary embodiment, the scan dimensions are sized to the dimensions of the minimum object size that can cause a hazard or obstruct train travel along the track. If the width of the object in the horizontal plane is 27 inches or larger, that minimum dimension can trigger an alarm. Alternatively, the width of the object in the horizontal plane can be configured to be any width relevant to a particular application. FIG. 4A shows system installation 400 monitoring tracks 202 with no hazard. FIG. 4B shows system installation 400 monitoring tracks 202 with an object/hazard 404. When an object 404 is in the detection area 212, the obstacle detection sensor 102 can determine the size of the obstruction and provide an alarm output to the VLC 112 if the object 404 is determined to be a hazard based on the object characteristics, including the object's height, width, length, movement, or other suitable characteristics.

The Wireless Slide Fence system can reduce both the safety risk and operating cost of deploying maintenance personnel to facilitate side fence repairs. Advantageously, the Wireless Slide Fence does not alarm on small rocks or rocks landing clear of the track (i.e. objects posing no potential hazard or obstruction to train passage), which reduces train delays and optimizes train operations through the detection zone.

The present disclosure achieves at least the following advantages:

1. The Wireless Slide Fence system can automatically reset the alarm and restore the signal system/train control system to normal operation, eliminating additional train delay incurred pending slide fence repairs;
2. The Wireless Slide Fence system offers improved object detection and alarm verification while significantly reducing false alarms and needless train delay without compromising existing safety levels; and
3. The system reduces operating cost and, more importantly, reduces the safety risk to maintenance personnel associated with installing, maintaining, and repairing the current slide fence.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims. In particular, the integration of commercial-off-the-shelf (COTS) equipment may be utilized in the new and unconventional manner described herein.

The description contained herein should not be read as implying that any particular element, step, or function can be an essential or critical element that must be included in the claim scope. Also, none of the claims are intended to invoke 35 U.S.C. § 112(f) with respect to any of the appended claims or claim elements unless the exact words "means for" or "step for" are explicitly used in the particular claim, followed by a recited function. Use of terms including, but not limited to, "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and are not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions are established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A wireless slide fence system configured to detect an object capable of obstructing train passage along a track, comprising:
   a plurality of obstacle detection units configured to transmit a signal proximate a railroad track and receive a reflection of the signal from an object proximate the railroad track, wherein one or more obstacle detection units detect an object in a detection zone and generate a detection alert, when the reflected signal is received; and
   a vital logic controller operably coupled to the obstacle detection units and configured to control the obstacle detection units, receive the alert, and transmit an indication of an obstacle to a train control system to reduce the speed of or stop a train;
   wherein the obstacle detection units include shutters configured to open and close to protect the obstacle detection unit from damage, and
   wherein the vital logic controller is operable to clear an alarm state and the indication of the obstacle to the train control system via an encrypted network if a clear state is reported over a clear time period.

2. The system of claim 1, wherein the signal transmitted by the plurality of obstacle detection units is an optical signal.

3. The system of claim 1, wherein the signal transmitted by the plurality of obstacle detection units is an acoustic signal.

4. The system of claim 1, wherein each of the plurality of obstacle detection units has a field of view different from the other obstacle detection units.

5. The system of claim 4, wherein adjacent fields of view at least partially overlap.

6. The system of claim 1, wherein the obstacle detection units generate a detection alert when the object has a width greater than a predetermined width.

7. The system of claim 1, wherein the obstacle detection units generate the detection alert only if the object is still detected after a predetermined loitering time.

8. The system of claim 7, wherein where the object must be continuously detected during the predetermined loitering time to be determined a valid alert.

9. The system of claim 1, wherein the vital logic controller opens and closes the shutters.

10. A wireless slide fence system configured to generate an indication of an obstacle when an object capable of obstructing train passage is identified, comprising:
    a vital logic controller including computer-executable instructions that when executed cause the controller to:
      receive an obstacle detection alert from an obstacle detection unit for an object in a detection zone proximate a railroad track;
      determine whether the object is in the detection zone after a predetermined loitering time;
      transmit an indication of an obstacle to a train signaling system or a train control system via an encrypted network if the object is in the detection zone after the predetermined loitering time;
      close shutters disposed on the obstacle detection unit to protect a transceiver for a predetermined period;
      open the shutters for a predetermined rescan period to rescan the detection zone for the object;
      determine whether the object is in the detection zone after a predetermined re-scan period;
      clear the alarm state and the indication of the obstacle to the signal system or the train control system via an encrypted network if a clear state is reported over a clear time period.

11. The system of claim 10, wherein the train signaling system is programmed to flash red to indicate to a train that the train must proceed at restricted speed and stop short of any obstruction.

12. The system of claim 10, wherein the vital logic controller transmits the indication directly to the train's positive train control (PTC) system.

13. The system of claim 10, wherein all object detection units must continuously report a clear state over a clear time period during the re-scan period.

14. The system of claim 10, wherein the clear time period is at least a portion of the re-scan period.

15. A computer-implemented method for generating an indication of an obstacle when an object capable of obstructing train passage is identified, the computer-implemented method comprising:

receiving an obstacle detection alert from an obstacle detection unit for an object in a detection zone proximate a railroad track;

determining whether the object is in the detection zone after a predetermined loitering time;

transmitting an indication of an obstacle to a train signaling system or a train control system via an encrypted network if the object is in the detection zone after the predetermined loitering time;

closing shutters disposed on the obstacle detection unit to protect a transceiver for a predetermined period;

opening the shutters for a predetermined rescan period to rescan the detection zone for an object;

determining whether the object is in the detection zone after a predetermined re-scan period;

clearing the alarm state and the indication of the obstacle to the train control system via an encrypted network if a clear state is reported over a clear time period.

16. The system of claim 15, wherein the train signaling system is programmed to flash red to indicate to a train that it must proceed at restricted speed and stop short of any obstruction.

17. The system of claim 15, wherein the vital logic controller transmits the indication directly to the train's onboard positive train control (PTC) system.

18. The system of claim 17, wherein all object detection units must continuously report a clear state over a clear time period during the re-scan period.

19. The system of claim 15, wherein the clear time period is at least a portion of the re-scan period.

* * * * *